United States Patent [19]

Kitai et al.

[11] Patent Number: 4,757,353
[45] Date of Patent: Jul. 12, 1988

[54] APPARATUS FOR SETTING REGIONS TO BE TRIMMED ON AN ORIGINAL PICTURE IN A PHOTOGRAPHIC PRINTER

[75] Inventors: Makoto Kitai; Takashi Omori, both of Kyoto, Japan

[73] Assignee: Dainippon Screen Mfg. Co., Kyoto, Japan

[21] Appl. No.: 33,095

[22] Filed: Mar. 31, 1987

[30] Foreign Application Priority Data

Mar. 31, 1986 [JP] Japan ................. 61-70903

[51] Int. Cl.$^4$ .............................................. G03B 27/46
[52] U.S. Cl. .......................................... 355/44; 355/64; 355/54
[58] Field of Search .............. 355/40, 44, 61–64, 355/67, 54; 358/76–78, 214, 213.13

[56] References Cited

U.S. PATENT DOCUMENTS 4,161,709 7/1979 Spence-Bate .......................... 355/64
4,645,334 2/1987 Shimada et al. ...................... 355/40
4,667,245 5/1987 Matsumoto et al. ................. 358/214

Primary Examiner—L. T. Hix
Assistant Examiner—D. Rutledge
Attorney, Agent, or Firm—Hayes, Davis & Soloway

[57] ABSTRACT

An apparatus for setting regions to be trimmed on an original picture in a photographing printer which produces a trimmed reproduction picture image comprises a base on which a projecting lens for projecting the original picture on the surface of a photosensitive material and a TV camera for photographing the original picture are disposed so that they may be alternately exchanged their position to be set on a position aligning with an optical axis of a light source, a monitor which displays the original picture image photographed by the TV camera and an indicating means which indicates a configuration showing substantially the same region as that of to be trimmed by a trimming mask frame in overlapped manner with said picture image on the monitor.

4 Claims, 3 Drawing Sheets

APPARATUS FOR SETTING REGIONS TO BE TRIMMED ON AN ORIGINAL PICTURE IN A PHOTOGRAPHIC PRINTER

BACKGROUND OF THE INVENTION

The present invention relates to a photographic printer, particularly relates to an apparatus which, in the case of reproducing desired regions in a reproduced color picture image selectively, that is, in the case of carrying out trimming with a color printer for manufacturing reproduced color picture images of color original pictures by projecting exposing lights on color photographic printing papers, sets accurately regions to be trimmed in an enlarged or a reduced picture image with desired reproducing magnification.

In a printing place, so called "Color Laboratory", at which operations for exposing color negative films on color photographic printing papers and manufacturing reproduced positive picture images in a large scale are carried out, recently an automatic color printer which uses wave-shaped color photographic printing papers has been widely spreading. This automatic color printer is adapted to feed a predetermined length of a wave-shaped color photographic printing paper wound up to a roll to an exposing part of the printer and projectingly expose a picture image of a color original picture onto the surface of a color photographic printing paper with any desired magnification by a photographic lens. As afore-mentioned processings, in the automatic printer desired color printings are obtained by developing the exposed photographic printing papers.

Such printers as described the above are useful in themselves, however, in the case of reproducing any desired region(s) of an original color by trimming it to any desired size, there are liable to occur somewhat inconveniences as follows, that is, in the automatic color printing apparatus a main body of the apparatus is accommodated in a light-shielding case so that the apparatus can carry out so called light-room operation, and particularly, it is common that the light exposing part of the apparatus is completely shielded from light coming from the exterior. Accordingly, it is rather hard to perceive visually a projected picture image on the focusing plane and it is also difficult to confirm status of trimming visually. In the conventional color printing operation, because of the afore-mentioned reasons, reproduction magnification is calculated by basing on the size of desired region of the color original picture and that of desired reproduction picture image, and is set to the color printer, and a trimming mask covering the focusing plane of the exposing part is disposed at a position near to a light source side of a photosensitive material, by aligning the center of the trimming mask and that of the original color picture to an optical axis of a photographing lens so that trimmed regions may be intermediately established.

However, in the afore-described means it is troublesome to measure sizes of the desired region of the original picture and the reproduced picture image, and particularly in the cases of reproducing magnified picture images, in general, measurement is liable to become inaccurate resulting from a size of the region of the original picture being too small, which results in causing error in trimming operation. There is further inconvenience whether the trimming operation has been performed properly or not can not confirm until the exposed photographic printing paper is developed in the conventional printer.

As one of measures for solving the afore-described problem the applicant of the present application et al proposed "A VIEWING DEVICE FOR A PHOTOGRAPHIC ENLARGER" and filed a patent application the application number of which is Japanese Patent Application No. 58-135187 (Japanese Patent laid-open Publication No. 60-26942). In this patent application there is disclosed an invention a focusing plane of a projecting type color printer which projects light downwardly along a vertical optical axis thereof is made with an opaque plate, and a reflecting mirror inclined with respect to the optical axis is disposed at the lower portion of the opaque plate so as to be able to confirm a picture image projected onto the reflecting mirror visibly. As described the above, this viewing device is adapted to be able to judge whether the trimming operation is performed properly or not.

There has been also proposed other means in which an image of an original picture photographed by a TV camera disposed at a position facing to a original picture equipping part is displayed on a picture screen of a monitor, and by displaying a standard line which indicates desired reproduced picture regions on the picture screen of the monitor, states of the trimming have been confirmed. However, in this case the TV camera must be disposed at a position out of an optical passage of the light exposed onto a color printing paper so that the light exposing the color printing paper may not be prevented, and the TV camera photographs the original picture not in the front direction, but photographs it in the oblique direction, accordingly, there generates distortion on the picture image displayed on the picture screen of the monitor, which results in causing inconvenience for carrying out accurate trimming operation. In order to solve the afore-mentioned inconvenience, it is proposed that the TV camera is provided so that it may be moved from a position on the optical axis which just faces to the surface of the original picture to a position out of the light passage of the exposing light.

In addition, the Applicant of the present invention et al filed a patent application the application of which is Japanese Patent Application No. 60-97867 (AN APPARATUS FOR SETTING REGIONS TO BE TRIMMED OF AN ORIGINAL PICTURE IN A PHOTOGRAPHIC PRINTER; same title of the present invention) with respect to an apparatus in which an original picture holder for holding the original picture is moved, in the case of setting regions to be trimmed, from an original position on the optical passage of the exposing light to the photographing optical passage of the TV camera, and with a monitor disposed at a position where is accessible for an operator, the trimmed regions can be confirmed.

In the afore-described conventional techniques there are found several disadvantages respectively as follows. In the photographic printer which uses a wave-shape photosensitive material, the photographic material is always placed on the focusing plane in a means having a mirror disposed at the back side of an opaque focusing plate, accordingly, what with its being hard to recognize focusing conditions thereof through the opaque focusing plate, and what with its also being liable to waste the photosensitive materials which are exposed in focusing operation, there can not be found satisfactory results for the application. In addition, in the case of confirming visually, because of the focusing plane being placed considerably far from the operator, it is also difficult to observe minute parts of the picture image. Further, as described the above, the means in which the TV camera is to be disposed at a predetermined position in the oblique direction to the surface of the original picture has a disadvantage to produce deformation on the displayed picture image, accordingly, it is very difficult to carry out accurate trimming operation. The means in which the TV camera is provided so that it can be moved from a position directly opposite to an original picture on an optical axis to a position out of the optical axis is required to dispose the TV camera movably in the light shielding part around the optical axis, so that a complicated and large scale of construction can not be evaded, which results in not only high cost but also occupation of wide space. The means in which the TV camera is fixed out of the optical axis and the original picture holder is moved from the position on the optical axis at exposing time to the position where the TV camera carries out taking-photograph in the case of regions to be trimmed being set is more advantageous than the above-described two means each of which is adapted to move the TV camera. However, still there are remained such disadvatages as being complicated and large scaled construction in the former means.

In order to solve the afore-described disadvantages of the conventional means the apparatus for setting regions desired to be trimmed on the original picture in the photographic printer according to the present invention is constructed as follows, that is, it is constructed fundamentally that a TV camera is disposed so as to be movable from a position on an optical axis of an exposing light to a position out of the optical axis, and concretely a small-sized and light-weighted TV camera using CCD sensor array is mounted on a rotary turret or a sliding type seating plate in parallel with a projecting lens, and can be moved on the optical axis so as to exchange with the projecting lens.

SUMMARY OF THE INVENTION

The first object of the present invention to provide an apparatus for setting regions to be trimmed on an original picture in a photographic printer which is adapted to trim desired regions on an original picture with any desired sizes.

The second object of the present invention is to provide an apparatus for setting regions to be trimmed on an original picture in a photographic printer in which trimming operation of any regions of an original picture desired to be trimmed can be performed by visually confirming the regions on a screen of a monitor.

The third object of the present invention is to provide an apparatus for setting regions to be trimmed on an original picture in a photographic printer in which a TV camera is disposed movably from a position on an optical axis of an exposing light to a position out of the optical axis so that desired regions of an original picture may be trimmed by confirming visually.

The fourth of the present invention is to provide an apparatus for setting regions to be trimmed on an original picture in a photographic printer wherein a TV camera is mounted on a sliding type seating plate or a rotary turret in parallel to a projecting lens, and by exchanging with the projecting lens so that the TV camera may be on the optical axis.

To realize the above objects in the present invention the following improvements are proposed by the present inventor. Since construction of the apparatus according to the present invention is as described the above, a distance between the TV camera and the surface of the original picture varies in accordance with movement of the projecting lens depending on magnification. However, by using a lens having short focal length as a photographic lens of the TV camera, a picture image of which degree of brightness is that of practically available is displayed widely on the picture screen of the monitor.

On the other hand at the exposing surface, corresponding to trimming size of a reproduced picture image, a plurality of trimming mask frames having different opening sizes are exchageably disposed, and a standard line which indicates regions to be trimmed corresponding to the disposed trimming mask frames is displayed on the picture screen of the monitor. Thus, the original picture image photographed by the TV camera which moves to the optical axis by exchanging with the projecting lens is displayed on the picture screen of the monitor together with the standard line indicating the trimming regions.

DESCRIPTION OF THE PREFERRED EMBODIMENT

Figure 1:
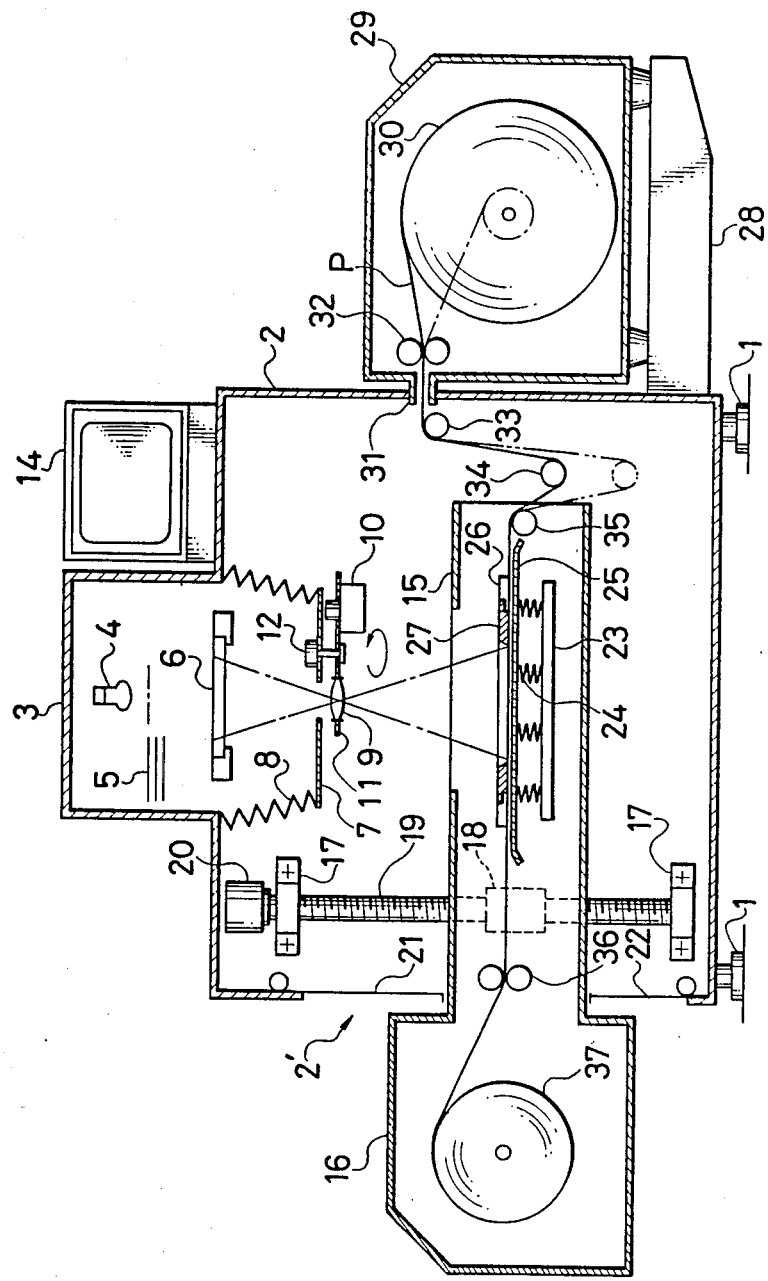
FIG. 1 is a front sectional view showing an outline of one of apparatus embodying the present invention.
Figure 2:
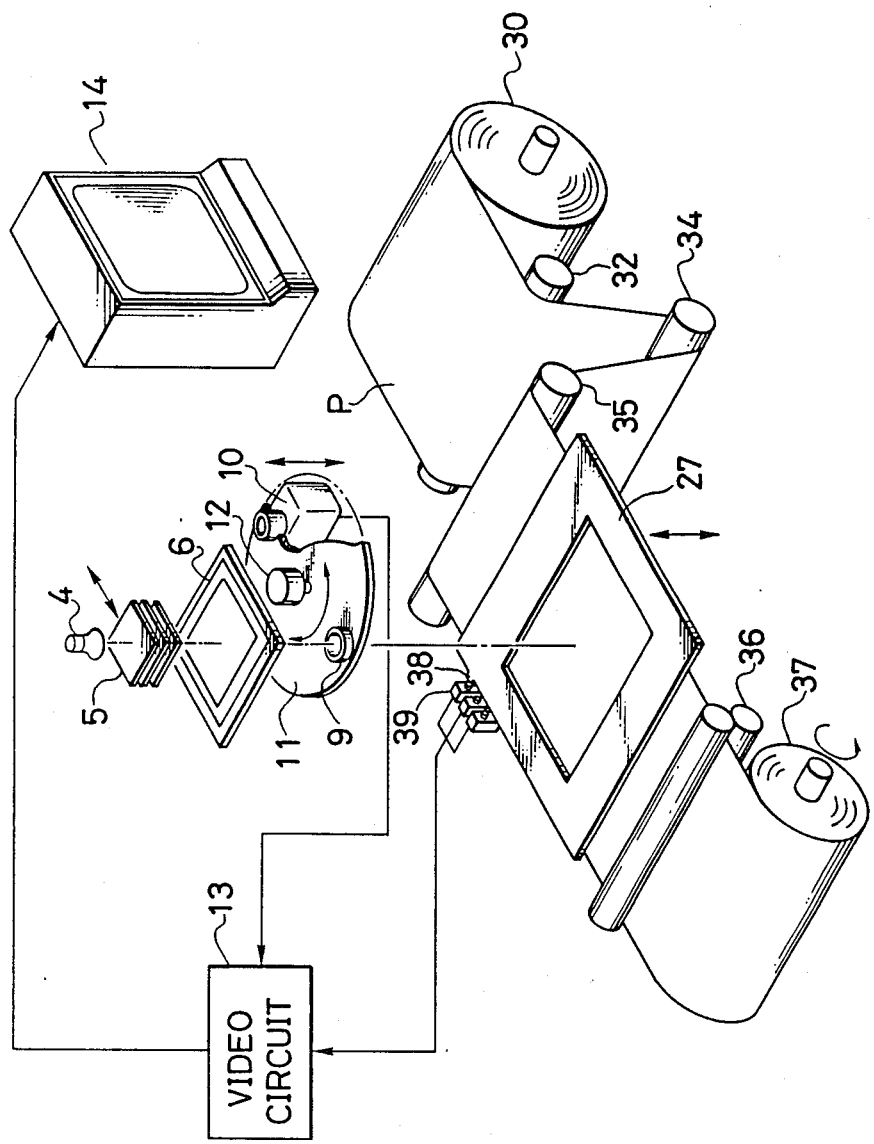
FIG. 2 is a perspective view showing essential parts of the apparatus shown in FIG. 1.

FIG. 1 is a front sectional view showing an outline of one embodiment of a color printer of projection type to which the present invention is being applied, and FIG. 2 is a perspective view showing the essential part of the embodiment.

A lamp house 3 which accommodates a light source lamp 4 for exposing light, a color correcting filter 5 etc. is disposed at the central part of the upper surface of a body 2 of an apparatus supported by a plurality of supporting bases 1, and at directly under the lamp house 3 there is disposed an original picture holder 6. The original picture holder 6 is the same one that of applied to a photographic printer of this type or a photographic enlarger, and has a frame body construction provided with an opaque plate on which an original picture film(s) is applied. The original picture holder 6 is disposed in the lamp house 3 so that it can move any directions with respect to an optical axis of a light from the light source and rotate in the horizontal plane. Means for these movements and rotation may be such means that have been used heretofore in the means of this type, for example, same as those of usual photographic enlargers, the original picture holder 6 is mounted on a receiving plate. At a part on the receiving plate onto which an optical axis of the light passes is bored so as to have an opening of a desired size, and it may be sufficient to provide an adjusting means for adjusting the position manually to the position.

At an intermediate portion of the body 2 a lens frame 7 is disposed so that it may be moved vertically by a driving means not shown in the drawings, and between the circumferential margin of the lens frame 7 and the lower end circumferential margin of the lamp house 3 there is provided a bellows 8 to connect them with each other. At the underside of the lens frame 7, a disc-shaped rotary seating plate 11 to which a projecting lens 9 and a TV camera 10 are equipped is attached to an axis of an exchanging device 12 mounted on the lens frame 7. The projecting lens 9 and the TV camera 10 are disposed at an equi-distance from from the rotational center of the rotary seating plate 11, so that when the exchanging device 12 operates, the projecting lens 9 and the TV camera 10 come to a position on the optical axis at which they are exchanged and set thereon alternately.

In the embodiment shown in the drawings it is illustrated that the projecting lens 9 and the TV camera 10 are exchanged with each other by the rotary seating plate 11 and set onto the optical axis, however, of course, it is also possible to make the rotary seating plate 11 so that it may slide in the horizontal direction. In addition, there is shown only one projecting lens 9, however, it is also possible to dispose a plurality of projecting lenses of different focal lengths in parallel with one another so that they may be exchangingly used in accordance with desired projecting magnification, if necessity demands.

In the case of projecting and exposing an image of the original picture attached to the original picture holder 6 on a portion to be exposed of the lower part, the projecting lens 9 is aligned to the optical axis, and in the case of trimming regions of the original pictures being set, the TV camera 10 is aligned to the optical axis. The image(s) of region(s)of the original picture photographed by the TV camera 10 is displayed on a monitor 14 through a video circuit 13. Under the lens frame 7 a case 15 for ascending and descending the exposing portion is disposed so as to move vertically along a guide (not shown), and the left end thereof extends to the outside of the body 2 through an opening part 2' bored on one side of the body 2, and a magazine 16 in which the exposed photographic printing papers are to be accommodated is integrally provided thereat. In the body 2 a nut 18 fixedly secured to the case 15 is engaged with a screw axis 19 supported vertically by a pair of vertically provided bearings 17, and by rotating the screw axis 19 with a motor 20 the case 15 and the magazine 16 are moved up and down.

In the opening 2' there are provided light shielding shutters 21 and 22 on the upper and the lower parts of the case 15. Each of these shutters 21 and 22 is wound to respective spring rollers 21' and 22' supported pivotally in the body 2, and each of the tip ends of the shutters is connected to the case 15, and they expand and contract their lengths in accordance with up and down movement of the case 15 to shut the opening part 2'. In the case 15 a supporting plate 23 is horizontally secured and a pressing plate 25 is provided on the upper surface of the supporting plate 23 through appropriate numbers of springs 24. The pressing plate 25 holds a color photographic printing paper web (P) between the upper surface thereof and a trimming mask frame 27 on the upper surface of which a pair of guide rails 26 extend in the horizontal direction (in FIG. 1) are provided, and the photographic printing paper (P) is held on the exposing plane. At the lower part of the right outer side of the body 2 a magazine mounting table 28 is projectingly disposed, and thereon a magazine 29 into which a roll 30 of unexposed photographic printing papers is to be accommodated. The color photographic printing paper web (P) wound off from the roll 30 is fed to the body 2 through a slit 31 projectingly provided in the body 2.

The slit 31 is inserted into the opening bored in the body 2 so as to be taken out and in, and when the magazine 29 is mounted on a predetermined position of the magazine mounting table 28, the slit 31 is to be inserted into the body 2 with a predetermined. A space between the slit 31 and the circumferential edge of the opening is formed to be light-sealing with a suitable light-shielding means, for example, with rubber or the like. At a part of the magazine 29 which faces to the slit 31 a pair of feeding rollers 32 provided with one way clutch 32 are disposed. Accordingly, the color photographic printing paper (P) is fed to the body 2 side, but prevented from being reversely moved thereto.

A guide roller 33 is pivotted horizontally at the part to which the color photographic printing paper web (P) is fed, and the color photographic printing paper (P) winds round the guide roller 33 to direct downward, and is guided to an up and down roller 34 and a guide roller 35 pivotally supported in the case 15 so as to be introduced into the exposing part. The up and down roller 34 is a so called "dancer roller", and the roller is provided to an up and down movement driving means (not shown) through a spring which energizes the roller 34 to move in the downward direction. Accordingly, even if the case 15 changes its position by ascending or descending operation, it is adapted that the photographic printing paper web (P) can be maintained a tensioned state with an appropriate tension.

The photographic printing paper web (P) having passed through the exposing part, that is, the exposed photographic printing paper, is wound up by an exposed photographic paper roll 37 in the magazine 16 and accommodated therein through a pair of up and down driving rollers 36. During these operation being carried out, the photographic printing paper (P) pauses appropriately at the exposing position so that it may be exposed at desired manner. When the picture is exposed at the exposing part, the trimming mask frame 27 having the same size with that of a picture image to be reproduced is placed on the exposing part. To carry out the afore-mentioned operation a plurality of trimming mask frames each having an opening of previously desired size are previously prepared, and according to necessity, from a door provided at the front face of the body 2 these trimming mask frame 27 are to be inserted into a pair of the guide rails 26. At the rear edge of each of the trimming mask frames 27 there is formed a projection 38. Each of these projections 38 is formed at a position different from one another so that each of them may actuate any of corresponding switching means 39 provided in the body 2. Each of signals output from these switching means 39 is transmitted to the monitor 14 through the circuit 13, and a standard line of a size corresponding to that of an opening of a trimming mask frame by which the switching means is actuated is displayed on the monitor 14. The standard line may be displayed as a frame by a bright line, or may be shown by varying brightness of the picture image displayed on the monitor 14 by adjusting the opening part of the trimming mask frame and the circumference thereof. That is, on the picture screen of the monitor 14 there are displayed an image of the original picture photographed by the TV camera 10 and the standard line corresponding to the trimming mask frame placed on the exposing part in overlapped manner, and by corresponding a size of the picture image photographed by the TV camera 10 to be displayed to that of the picture image projected and focused on the exposing part, a trimmed state(s) of a picture image to be reproduced can be accurately displayed.

Figure 3:
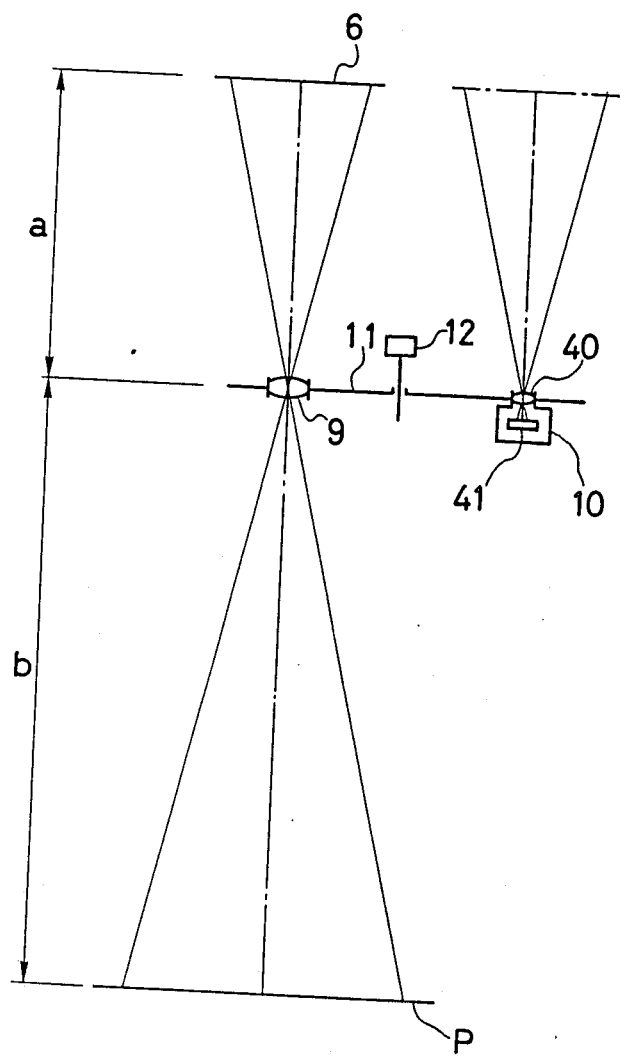
FIG. 3 is a diagram which shows a focusing image produced by a projecting lens, and a relation between the TV camera and a photographed image.

In FIG. 3 there is shown a relation between a picture image projected by the projecting lens 9 and an image photographed by the TV camera 10 diagramatically. Focusing the picture image by the projecting lens 9 is made by basing on the well known formula for lens, that is $$1/a + 1/b = 1/f$$

$$b/a = m$$

Accordingly, $$a = f(1 + 1/m)$$

$$b = f(1 + m)$$

Where,
- a: distance between an original picture and a projecting lens
- b: distance between the projecting lens and the focusing plane
- m: magnification.

Positions of the lens frame 7 and the case 15 in the vertical direction are set in accordance with desired magnification, and a picture image of any desired size is focused on the surface of the photographic printing paper web (P) disposed on the exposing part. On the other hand, when the TV camera 10 is placed on the optical axis, an image of the original picture is projected and focused on an image receiving element 41 by a photographing lens 40 in the TV camera 10. In the TV camera 10 according to the present invention a CCD sensor array is applied as the image receiving element 41, and as the photographing lens 40 a lens having short focal length and deep focal depth is used. Accordingly, even the TV camera 10 is small and light-weight, and even the distance between the original picture and the TV 10 itself varies, the picture image displayed on the picture screen of the monitor 14 can keep sharpness of a degree not causing any trouble practically. It is quite same as that of a fixed focus type simple camera in usual photographic cameras.

The TV camera 10 is, as described the above, disposed on the seating plate 11 in parallel with the projecting lens 9, and aligned in the optical axis alternately exchanging with the projecting lens 9. In order to coincide picture image regions in the trimming standard line of the original picture photographed by the TV camera 10 and displayed on the monitor 14, position of the lens frame 7 is adjusted to display the picture image on the monitor 14 with a desired size. To realize the afore-mentioned, at first each of positions of the TV camera which corresponds to respective reproduction magnifications is previously obtained, and in the case of the trimming regions being set, position of the lens frame 7 is adjusted so that the TV camera 10 may be set at a position corresponding to a desired magnification.

As described the above, by providing the trimming mask frame 27 selected as afore-mentioned, the standard line displayed on the monitor 14 indicates the trimming regions exposed with a desired magnification. By recognizing visually, the image of the original picture displayed on the monitor 14 and the standard line which indicates the trimming regions, by shifting the position of the original picture holder 6 in front and rear direction, in the right and left direction or by rotating it in the horizontal direction, desired regions in the original picture are aligned to the displayed standard line, and if exposure is performed with a desired magnification by substituting the TV camera 10 for the projecting lens 9 on the optical axis, a reproduction picture image trimmed with desired size can be exposed.

Further, the picture image displayed on the screen of the monitor 14 by the TV camera 10 is, in the embodiment shown in the drawings, a mirror image of a picture image reproduced on the photographic printing paper (P) in which the right and the left sides are reversed to those of the reproduced image. However, for setting desired trimming regions there is no hindrance for practical use of its being in the mirror image, and of course, if necessary, it is also possible to display an image which appears to be as same as the original picture, by processing signals appropriately in the circuit 13 so that the picture image displayed on the monitor 14 may reverse its right and left sides. In addition, when the trimming regions are set by the TV camera 10, it is liable to generate fog on a photographic printing paper placed at the exposing part by receiving light. Accordingly, when the Tv camera 10 is set on the optical axis, in order to prevent generation of fog on the printing paper, it is desired to provide a light-shielding means, for example, a lens hood etc. to shield light between the seating plate 11 and the TV camera 10, or it is also desired to provide a light-shielding mask which can perform opening and closing operation of the upper surface of the opening of the case 15, and adapted that, when the TV camera 10 is moved to the optical axis, it can shield the opening of the case 15 in linking with the movement of the TV camera 10.

The present invention has the following effects, that is;

1. States of trimming of the original picture being projected on the web-shaped photographic printing paper in the sealed frame is overlappedly displayed on the picture screen of the monitor together with the color original picture to be trimmed and the standard line for indicating regions to be trimmed, and by visually watching the trimming states to adjust the position of the original picture, accurate trimming regions can be set.

2. As the TV camera to photograph the original picture a small and light-weighted camera in which a CCD sensor array is applied is used, and is disposed in alignment with the projecting lens so as to be easily exchanged with it alternately. Accordingly, simplification of construction of the apparatus can be easily achieved. Thus, by adding relatively slight modification to the lens frame part of the original photographic printer, the same can be applied to the present invention.

What is claimed is:

1. An apparatus for setting regions to be trimmed on an original picture in a photographic printer in which an image of the original picture is projected and focused on the surface of a photosensitive material on which a trimming mask frame of a size same as that of a desired reproduction picture image is mounted to expose and record a trimmed reproduction picture, characterized by comprising:

a means for disposing a projecting lens which projects said image of the original picture onto the surface of said photosensitive material and a TV camera which photographs said original picture so that they may be alternately set on a position aligning with an optical axis which directly faces to the original picture;

a monitoring means for displaying said original picture image photographed by said TV camera disposed on the position aligning with said optical axis; and an indicating means for indicating a configuration which shows substantially the same region as a region to be trimmed by said trimming mask frame in overlapped manner with said original picture image on the picture screen of said monitoring means.

2. An apparatus according to claim 1, wherein said TV camera comprises a photographing lens having a short focal length and a CCD sensor array as photographing elements.

3. An apparatus according to claim 1 or 2, wherein said projecting lens and said TV camera are disposed on a seating plate which rotates around an axis parallel to said optical axis so that they may be alternately set on the position aligning with the optical axis by the rotation of said seating plate.

4. An apparatus according to claim 1 or 2, wherein said projecting lens and said TV camera are disposed in parallel on a seating plate which can move reciprocally in a direction crossing with the optical axis so that they may alternately set on the position aligning with the optical axis according to reciprocal movement of said seating plate.

* * * * *